United States Patent
Chang et al.

(10) Patent No.: US 9,633,335 B2
(45) Date of Patent: Apr. 25, 2017

(54) MANAGING RELATIONSHIP AND CONTACT INFORMATION

(71) Applicant: Accompani, Inc., Los Altos, CA (US)

(72) Inventors: Amy Chang, Los Altos, CA (US); Twum Djin, Santa Clara, CA (US); Ryan Mcdonough, Los Altos, CA (US); Jan M. Ruhl, San Francisco, CA (US); Richard J. Walsh, IV, Palo Alto, CA (US)

(73) Assignee: Accompani, Inc., Los Altos, CA (US)

( * ) Notice: Subject to any disclaimer, the term of this patent is extended or adjusted under 35 U.S.C. 154(b) by 0 days.

(21) Appl. No.: 14/168,690

(22) Filed: Jan. 30, 2014

(65) Prior Publication Data

US 2015/0212678 A1    Jul. 30, 2015

(51) Int. Cl.
*G06F 3/048* (2013.01)
*G06Q 10/10* (2012.01)
*H04N 1/00* (2006.01)

(52) U.S. Cl.
CPC ........ *G06Q 10/10* (2013.01); *H04N 1/00331* (2013.01)

(58) Field of Classification Search
CPC ........... G06K 9/00369; G06K 9/00375; G06K 9/00677; G06K 9/00302; G06K 9/3241; G06T 5/50; G06T 2207/30196; G06F 17/30256; G06F 3/0482; G06F 3/0484; G06F 17/30029; G06F 3/04883
See application file for complete search history.

(56) References Cited

U.S. PATENT DOCUMENTS

2009/0322906 A1* 12/2009 Watanabe .......... H04N 1/00331
                                                              348/231.99

* cited by examiner

*Primary Examiner* — Jeffrey A Gaffin
*Assistant Examiner* — Ayesha Huertas Torres
(74) *Attorney, Agent, or Firm* — Goodwin Procter LLP

(57) ABSTRACT

Methods, systems, and apparatus, including computer programs encoded on a computer storage medium, for managing a relationship with and information about a contact. An example includes a client device that can be used to manage and keep track of information about a contact's family.

23 Claims, 10 Drawing Sheets

MANAGING RELATIONSHIP AND CONTACT INFORMATION

TECHNICAL FIELD

The present disclosure relates generally to the field of contact management tools, and in particular to systems and methods for managing relationships and interactions between individuals and their contacts.

BACKGROUND

Individuals often acquire a list of contacts through the course of their professional and/or personal lives. Contact management software can be used to keep track of information about the contacts, such as names, phone numbers, and addresses. Such software can be useful when an individual wants to get in touch with a contact, but has not memorized the contact's contact information.

SUMMARY

In general, one aspect of the subject matter described in this specification can be embodied in methods that include the actions of: providing an image in a graphical user interface wherein the image comprises an arrangement of one or more family member depictions, each family member depiction being based on respective attributes of a corresponding family member; providing an interactive first control wherein the first control has a respective graphical representation in the graphical user interface; obtaining input based on user interaction with the graphical representation of the first control, the input indicating a count of one or more additional family members wherein the count is based on an extent of the interaction; modifying the image in the graphical user interface to add a respective depiction of each of the additional family members to the arrangement; and modifying the graphical user interface to include a graphical representation of a respective information input region for each of the additional family members wherein the input region allows for user input of one or more respective attributes for the family member. Other embodiments of this aspect include corresponding systems, apparatus, and computer programs.

These and other aspects can optionally include one or more of the following features. The graphical representation of the first control can indicate the count. The family member depictions can include a depiction of a child and a depiction of a parent, in which the child depiction is smaller than the parent depiction. A particular family member depiction can be an outline of a shape resembling a human being or an animal. In instances where the family member depictions include one or more parent depictions and one or more child depictions, the parent depictions can be in the center of the arrangement. The first control can be a slider control, a wheel control, or a roller control. In some instances, only a portion of the graphical user interface is visible. A particular attribute can be one of: gender, spousal relationship, age, and species. A particular size of a family member depiction can be based on an age of the corresponding family member. A particular input region can receive user input comprising a first attribute of an additional family member. The depiction of the additional family member can be modified in the image to reflect the first attribute, which can comprise one or more of: changing a size of the depiction, changing a shape of the depiction, annotating the depiction with a name of the family member, and annotating the depiction with an age of the family member.

In general, one aspect of the subject matter described in this specification can be embodied in methods that include the actions of: providing a graphical user interface having an interactive date list adjacent to an interactive appointment list wherein the date list comprises a plurality of day dates in increasing order and wherein the appointment list comprises a plurality of appointments ordered by date and time; receiving user input scrolling the appointment list such that a first appointment in the appointment list is replaced at a head of the appointment list by a second appointment in the appointment list such that the second appointment is visible in the graphical user interface; and after the second appointment is positioned at the head of the appointment list, scrolling the date list such that a first day date in the date list is replaced at a head of the date list by a second day date in the date list that is for the second appointment such that the second day date is visible in the graphical user interface, wherein the appointment list remains stationary during the scrolling of the date list. Other embodiments of this aspect include corresponding systems, apparatus, and computer programs.

These and other aspects can optionally include one or more of the following features. In some implementations, user input can be received by scrolling the date list such that a third date is positioned at the head of the date list and is visible in the graphical user interface. After the third date is positioned at the head of the date list, the appointment list can be scrolled such that a third appointment in the appointment list that is for the third date is positioned at the head of the appointment list and is visible in the graphical user interface. In other implementations, user input can be received by selecting a date in the date list which is visible in the graphical user interface. In such implementations, the date list can be scrolled such that the selected date is positioned at the head of the date list, where the appointment list remains stationary during the scrolling of the date list; and the appointment list can be scrolled such that an appointment for the selected date is positioned at the head of the appointment list, where the date list remains stationary during scrolling of the appointment list. The head of the date list can be a topmost or leftmost position in the date list that is visible in the graphical user interface; and the head of the appointment list can be a topmost or leftmost position in the appointment list that is visible in the graphical user interface. Scrolling can occur vertically or horizontally. A particular appointment in the appointment list can include a respective representation of one or more contacts for the meeting in the graphical user interface. A representation of a particular contact can include a picture of the contact.

In general, one aspect of the subject matter described in this specification can be embodied in methods that include the actions of: providing a graphical user interface having an interactive date list adjacent to an interactive appointment list wherein the date list comprises a plurality of day dates in increasing order and wherein the appointment list comprises a plurality of appointments ordered by date and time; receiving user input to the date list resulting in a first day date in the date list being replaced at a head of the date list by a second day date in the date list such that the second day date is visible in the graphical user interface; and after the second day date is positioned at the head of the date list, scrolling the appointment list such that a first appointment in the appointment list is replaced at a head of the appointment list by a second appointment in the appointment list that occurs on the second day date such that the second appointment is visible in the graphical user interface, wherein the date list remains stationary during the scrolling of the appointment list. Other embodiments of this aspect include corresponding systems, apparatus, and computer programs.

These and other aspects can optionally include one or more of the following features. In some implementations, user input can be received by the user scrolling the date list. In other implementations, user input can be received by the user selecting the second day date in the date list. In instances where the user selects the second day date, the date list can be scrolled such that the second day date is positioned at the head of the date list, wherein the appointment list remains stationary during the scrolling of the date list.

In general, one aspect of the subject matter disclosed in this specification can be embodied in methods that include the actions of: identifying one or more contacts of a user that are each located in proximity of a geographic location; obtaining, for each of the identified contacts, one or more respective interaction events that each identify a respective interaction between the user and the contact and a respective date of the interaction; determining a respective acceptance likelihood for each of the identified contacts based on, at least, the respective interaction events for the contact, wherein the acceptance likelihood is a probability that the contact would accept a request for an in person meeting with the user; selecting each of one or more of the identified contacts based on the respective acceptance likelihood for the contact and a current date and time; and providing the selected contacts to a user device of the user. Other embodiments of this aspect include corresponding systems, apparatus, and computer programs.

These and other aspects can optionally include one or more of the following features. A respective acceptance likelihood for each of the identified contacts can be determined based on, at least one of the following: occurrence of a most recent interaction event for the contact having a date of interaction older than a first time period, which in some implementations can be a meal; a frequency of interaction based on respective dates of interaction for the contact; and occurrence of an electronic message between the contact and the user where the electronic message expressed a desire to meet in person. A particular interaction can be a telephone or video call, an electronic message, an in person meeting, or a meal. The geographic location can be a current location of the user or a location of an appointment for the user. A particular interaction event can identify a geographic location of the interaction. Providing the selected contacts to the user device can comprise at least one of the following: providing one or more suggested appointments in which the user could meet with a particular selected contact; and providing a telephone number, email address or physical address of the selected contacts.

In general, one aspect of the subject matter disclosed in this specification can be embodied in methods that include the actions of: selecting an upcoming appointment for a user and one or more contacts of the user that are scheduled for the appointment; determining a respective level of detail for each of the contacts wherein the level of detail specifies an amount of information to summarize from a profile of the contact; generating a respective dossier for each of the contacts based on information in the profile of the contact and according to the respective level of detail for the contact; and providing the generated dossiers to a client device of the user. Other embodiments of this aspect include corresponding systems, apparatus, and computer programs.

These and other aspects can optionally include one or more of the following features. One or more respective interaction events that each identify a respective interaction between the user and the contact and a respective date of interaction can be obtained for each of the contacts. A respective level of detail for each of the contacts can be determined based on, at least one of the following: an amount of time that has elapsed since a date of the most recent interaction event; a type of the most recent interaction event; a duration of the most recent interaction event; and a frequency of interaction based on respective dates of interaction for the contact. A particular interaction can be a telephone or video call, an electronic message, an in person meeting, or a meal. In some implementations, generating a respective dossier for each of the contacts based on information in the profile of the contact and according to the respective level of detail for the contact can comprise at least one of the following: generating a pictogram depicting family members of the contact, where the pictogram is annotated with one or more of names and ages of family members; generating information describing interests of the contact, where the interests include one or more of a favorite sport or sport team, a personal interest, a charity, and a hobby; and generating information describing an educational and professional background of the contact.

DETAILED DESCRIPTION

Implementations of this disclosure relate to systems and methods for managing relationships and/or interactions between individuals and their contacts. The methods can be performed by user interaction with a client device, sometimes in conjunction with the user providing input. A client device is a data processing apparatus such as, for example, a smart phone, a tablet computer, a portable computer, or a personal computer. Other types of client devices are possible. In some instances, the methods are performed by user interaction with an application stored on the client device or one or more servers accessible from the client device. Examples of various aspects and implementations of this disclosure are discussed in more detail below.

Managing a Contact's Family Information

Before encountering a contact it is often desirable to acquire or recall pertinent information about the contact and/or members of the contact's family. It can be even more desirable if the information is conveyed quickly and absorbed easily, for example, by reference to a single image and/or high-level notes. As one example, in a situation where an individual has little or no time to prepare for an encounter with a contact, it can be helpful to acquire the pertinent information with a quick reference to a client device. In many cases, this approach is superior to others in which information can be difficult to locate or interpret. An implementation of the present disclosure allows users to organize and keep track of information they receive regarding a contact's family, such that they can easily be reminded of the information before or during a future encounter.

Figure 1:
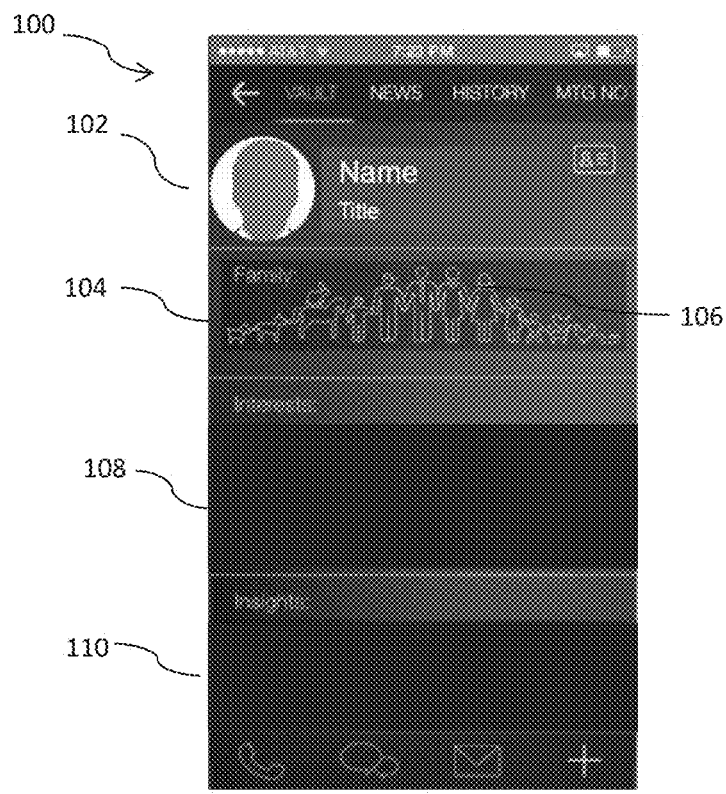
FIG. 1 illustrates an example graphical user interface for a profile of a contact as presented on a display of a client device.

Following receipt of information about a contact's family, the individual may engage a graphical user interface ("GUI") provided on a client device, for example, through execution of an application located on the client device or one or more servers accessible from the client device. As shown in FIG. 1, the GUI 100 can comprise a profile for each contact. A user may cause the GUI 100 to display the profile of a particular contact by, for example, selecting the contact's name from a contact list or saying the contact's name into a voice user interface ("VUI"). Each profile can include a field or region 102 containing high level identifying information about the contact, for example, the contact's name, title, and/or a picture of the contact. The profile can contain an image 104 of an arrangement of one or more family member depictions 106. Generally speaking a family member depiction 106 is an image or drawing that depicts a member of a person's immediate or extended family, for example, a depiction of a spouse, a parent (including adoptive or stepparents), a child (including adopted or stepchildren), a grandparent, a sibling, or a pet. For purposes of this disclosure the definition of family member should be interpreted broadly and should include any individual with which the contact has a family-member-like relationship, even if not related by blood. Examples of the depiction 106 itself can include an outline of a shape resembling a human being or an animal, a stick figure, a cartoon image, or a digital photograph.

The depictions 106 can indicate a particular attribute of a family member such as, for example, gender, age, species, or relationship to another family member depicted in the image 104. What follows is a non-exhaustive list of examples of how certain attributes may be depicted; however, such attributes may be depicted in any way that would make the attribute clear to a typical user. To indicate gender a depiction can include a particular item of clothing, for example, a female can be depicted wearing a dress, while a male is depicted wearing pants. Another method of indicating gender can include use of color, for example, females can be depicted in pink while males are depicted in blue. To indicate family relationships and/or age the depictions can be of varying size, for example, a parent depiction can be larger than a child depiction; similarly, an older sibling depiction can be larger than a younger sibling depiction. The configuration of the image can also be used to indicate family relationships, for example, the parents can be depicted in the center of the arrangement with the children on the exterior, or a parent can be depicted holding a child. A child may also be distinguished from an adult by being depicted with different features than the adult, for example, a male child can be depicted wearing a baseball cap and a female child can be depicted with pig tails. Children can also be depicted differently than other children based on differing attributes, for example, a baby can be depicted wearing a diaper. The species of a pet can be indicated by depicting the pet in a generic shape for that species such that a typical user would be able to identify the species. For example, a dog can be depicted in a generic shape for a dog and a cat in a generic shape for a cat, where the generic shapes of the different species are different. Pets can also be depicted differently than other pets of the same species based on differing attributes such as, for example, size or gender, using any of the techniques discussed already with respect to humans. As one example, a St. Bernard can be depicted larger than a Boston Terrier.

As will be discussed below, the image 104 can change as information is entered about a contact's family members. Before family information is entered, the image 104 may take a generic form indicating that no family information has been entered. For example, the image 104 can include no family member depictions, or every possible family member depiction.

The profile can also include fields for recording more detailed information about a contact. An example is an interests field 108 for recording the contact's interests, for example, a favorite sport or sports team, a personal interest, a charity, and/or a hobby. Another example is an insights field 110 into which the user can input notes for future reference, for example, potential questions to ask regarding the contact's family members.

For certain fields in the profile, information can be entered by the user. In implementations where the client device has a touchscreen, users can enter information using their finger or a stylus. In other instances, an input device such as, for example, a mouse or a keyboard can be used. Alternatively, in implementations having a VUI, information can be entered via the user's voice.

Further engagement of the GUI 100 allows a user to access additional information input regions to enter information about a contact's family. In an implementation in which all information input regions are visible at one time on a screen of the client device, such engagement may, for example, simply require selecting a desired information input region. In other implementations, additional actions may be required to bring certain information input regions into view. In some instances, this can include scrolling or swiping the GUI 100. In other instances, it can include selecting a link directed to a particular information input region or regions. The GUI 100 may, for example, include separate links for entering information about different categories of family members (e.g. spouse, children, pets, etc.).

Figure 2A:
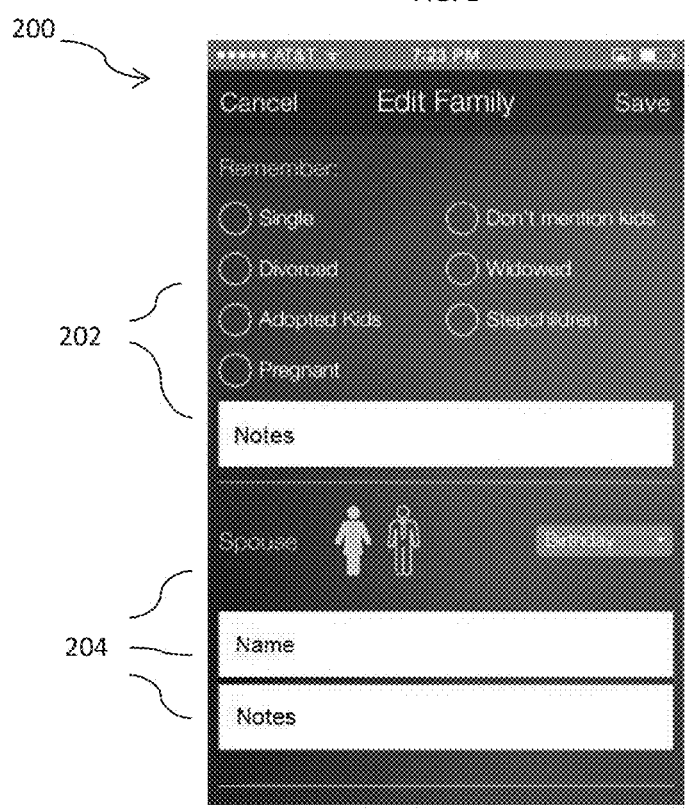
FIG. 2A illustrates examples of input regions for entering information about a contact's family.

FIG. 2A shows examples of information input regions of a GUI 200 for entering information about a contact's family. The GUI 200 can include a region 202 for entering things to remember about the contact's family, particularly things that may not be determinable from the image 104. Examples of such things can include whether the contact is single, divorced, or widowed; whether the contact is expecting children; or whether certain topics such as children and spouses should be avoided. The GUI 200 can also include a region 204 for entering attributes of a contact's spouse. A non-exhaustive list of such attributes includes the spouse's gender, name, birthday, age, and specific notes about the spouse. In some implementations, inputting that the spouse exists and/or the spouse's gender can include selecting a depiction of the spouse.

Figure 2B:
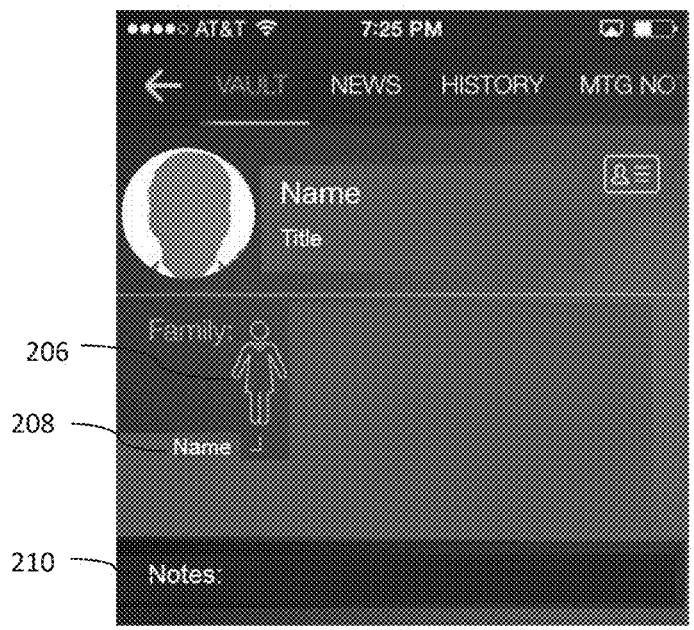
FIG. 2B illustrates an example modification of an image showing an arrangement of family member depictions when information is entered about a contact's family.

Upon inputting information about a contact's family member, the image 104 of an arrangement of one of more family member depictions can be modified to reflect such information. For example, if a user indicates that a contact has a female spouse, as shown, for example, in FIG. 2A, the image 104 can automatically be modified to show a depiction 206 of the spouse, as shown, for example, in FIG. 2B. The image 104 can be further modified to reflect additional information entered regarding the family member. For example, in implementations where the family member's name is entered, the image 104 can be modified to display the name 208. In instances where notes about the family member are added, the GUI 100 can be modified to include a notes region 210 which displays the notes.

Figure 3:
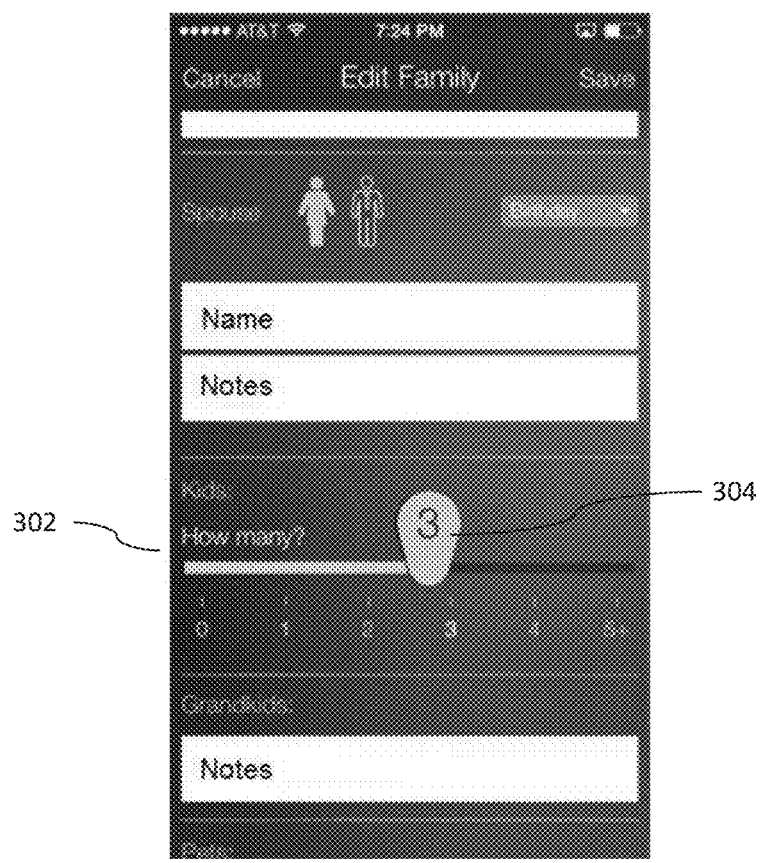
FIG. 3 illustrates an example graphical representation of an interactive first control that can be used to enter information about a contact's family.

In certain implementations, the user can engage an interactive first control 302 which in some cases has a respective graphical representation in the GUI 200, an example of which is shown in FIG. 3. A non-exhaustive list of such controls includes a slider control, a wheel control, and a roller control. User interaction with the first control can input additional information about a contact's family, for example, a count of additional family members. In implementations where a count is input, techniques for inputting information already discussed herein can be used. In addition, the count can be based on the extent of the user's interaction with the first control. Examples of such extents of interaction can include the distance a slider is slid, amount a wheel or roller is rotated, amount of time a button is held, or time elapsed between a first and a second engagement of the first control. In some instances, the graphical representation of the first control can indicate the count, for example, by displaying a number 304.

Following user interaction with the first control 302, the image 104 can be modified to reflect the information entered. In implementations where a count of additional family members is input, the image 104 can be modified to include respective family member depictions 106 for each additional family member. As one example, for purposes of illustration, if a user's interaction with first control 302 indicates that a particular contact has 3 children, the image 104 can be modified to include depictions 106 of 3 children.

Figure 4:
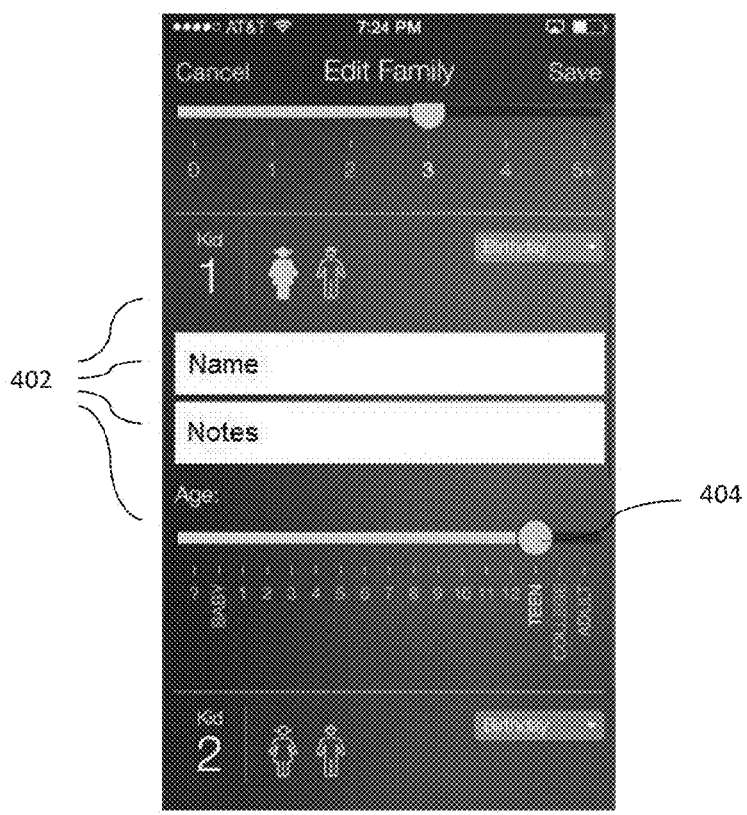
FIG. 4 illustrates examples of additional input regions for entering information about members of a contact's family.

In some cases, after inputting a count of additional family members, the user may engage an information input region 402 to enter information and/or attributes of each additional family member, as shown, for example, in FIG. 4. The GUI 200 can include a separate information input region 402 for each additional family member. In some instances, the GUI 200 is modified to include the additional input regions 402 following user interaction with the first control 302. In other instances, the additional input regions 402 are already in existence and the user either navigates to or is automatically directed to them.

A non-exhaustive list of attributes that can be entered into input region 402 includes the additional family member's gender, name, birthday, age, and additional notes about the family member. In an example implementation, inputting the family member's gender can include selecting a depiction of the family member. In some implementations, input of some or all attributes may require engagement of a second control 404 which can be, for example, a slide control, a wheel control, or a roller control. In such implementations, input can be based on the extent of interaction with the second control 404 in the same manner as described herein with respect to the first control 302. Upon entry of the attributes of additional family members, the image 104 can be modified such that the depictions 106 of the respective family members reflect such attributes, using the techniques for depicting attributes described already herein.

Figure 5:
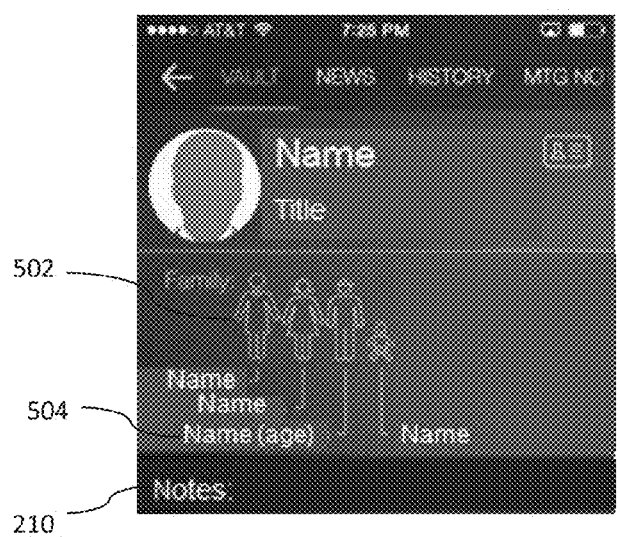
FIG. 5 illustrates an example modification of an image showing an arrangement of family member depictions when additional information is entered about a contact's family.

FIG. 5 shows an example modification of image 104 upon input of attributes and/or information for additional family members. The image 104 can include a modified arrangement 502 of family member depictions, where each depiction depicts at least one of the attributes entered for the family member. For purposes of illustration, in the example shown in FIG. 5, the modified arrangement 502 reflects that the family includes a female spouse, a female child, a male child, and a baby. The image 104 can also be modified to display each family member's name and/or age 504. Additional notes entered about a family member can be displayed, for example, in the notes region 210.

In some implementations, the method disclosed above for inputting additional information about a contact's family, starting with interacting with a first control 302, can be repeated for different categories of family members. For example a user may engage a first control 302 to input a count of children for a particular family and enter attributes and information about the children into input regions 402 resulting in a modification of image 104, as described above. In addition, for example, the user may engage another first control 302 to input a count of pets for a particular family and repeat the same method for the pets. The image 104 may then be modified such that it includes depictions of both the children and the pets. A non-exhaustive list of categories of family members for which information can be entered using this method includes: children, pets, grandparents, siblings, aunts/uncles, nieces/nephews, and cousins.

Figure 6:
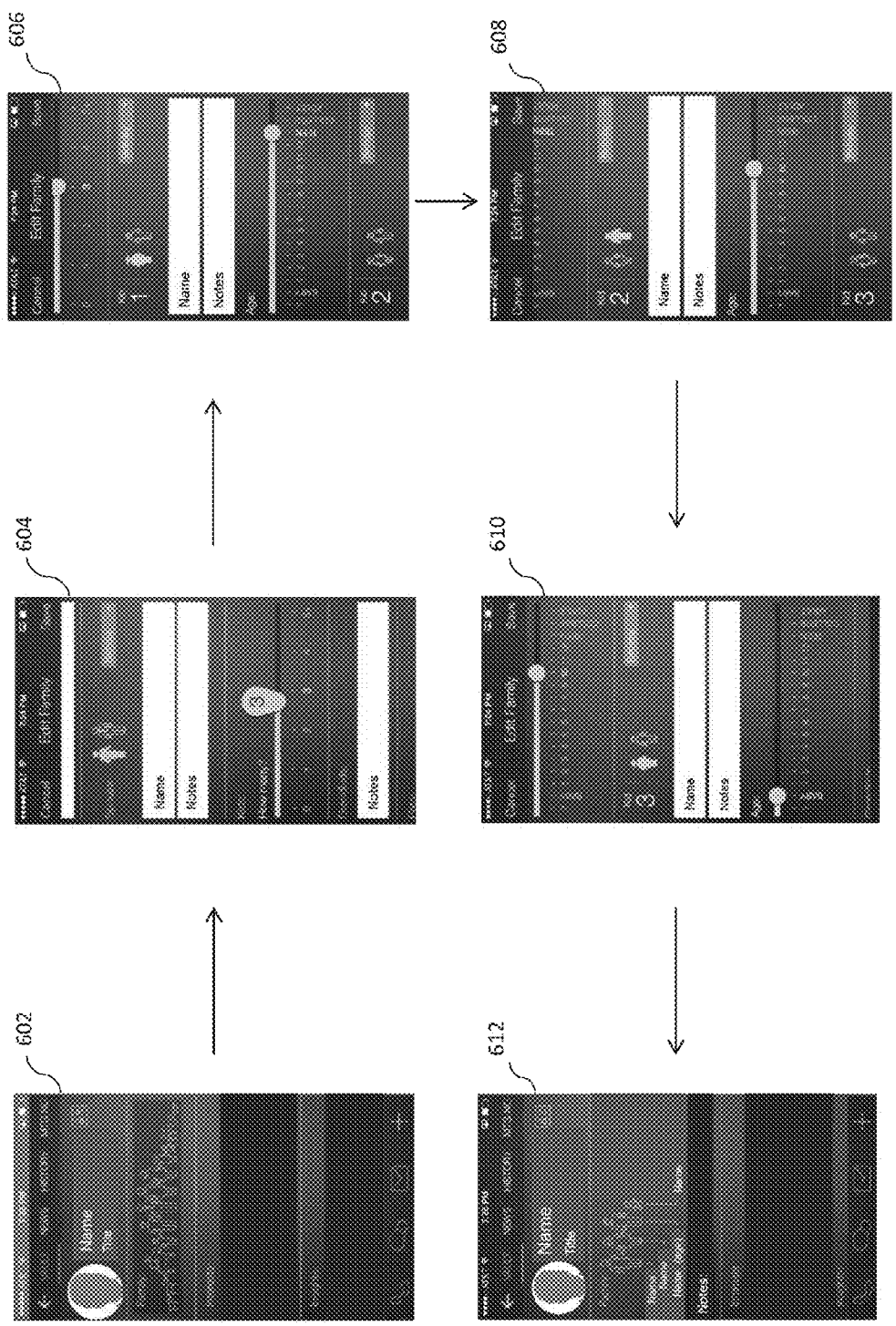
FIG. 6 is a flow chart showing example appearances of a graphical user interface as information is entered about a contact's family.

FIG. 6 is a flow chart showing example appearances of the GUI as a user enters information about a contact's family.

Figure 7:
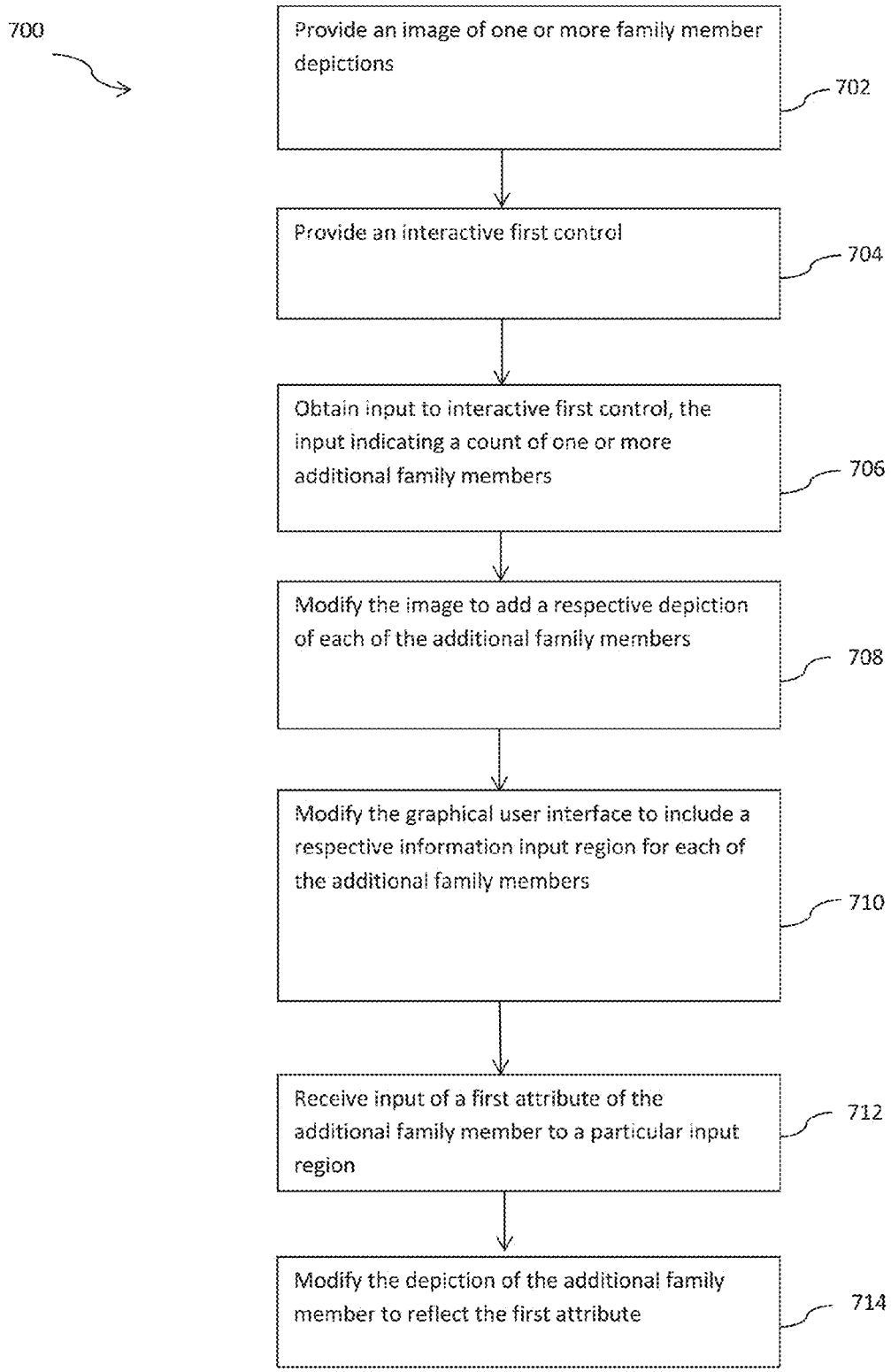
FIG. 7 is a flow chart showing an example method for managing a contact's family information.

FIG. 7 is a flow chart showing an example method 700 for managing a contact's family information. In various implementations, the method can be implemented by computer instructions executed by one or more data processing apparatus in one or more geographic locations. In some implementations, the software is implemented by the system described with reference to FIG. 12.

In some implementations the method can include providing 702 an image in a GUI including one or more family member depictions based on respective attributes of the corresponding family member, as shown, for example, in appearance 602 of the GUI. The method can include providing 704 an interactive first control which has a respective graphical representation in the GUI. The method can include obtaining 706 input based on user interaction with the first control, the input indicating a count of one or more additional family members based on an extent of interaction. Appearance 604 shows an example GUI during performance of both steps 704 and 706. Upon obtaining such input, the method can include modifying 708 the image in the GUI to add a respective depiction of each of the additional family members to the arrangement, as well as modifying 710 the GUI to include a graphical representation of a respective information input region for each of the additional family members, which allows for user input of respective attributes for the family member. Example graphical representations of respective information input regions for inputting attributes of family members can be seen in example GUI appearances 606, 608, 610. In some instances, the method can include receiving 712 user input of a first attribute of the additional family member to a particular input region, and modifying 714 the depiction of the additional family member to reflect the first attribute. Appearance 612 shows an example GUI after modification of the image to add respective depictions of additional family members and modification of the depictions to reflect the family members' attributes.

Calendar for Managing Appointments with Contacts

In order to manage future interactions with contacts it is often desirable to have a calendar of appointments that is easy to navigate and allows users to quickly absorb the important details of their appointments. Although calendars located on client devices such as calendar applications are well known, current options are either difficult to navigate, hard to interpret, or both. For example, on many calendar applications, in order to view appointments on a future date, the user is required to navigate through the appointments on all intervening dates. Of those calendars that do allow users to jump between dates, many only allow jumps in week or month increments. In other calendars, once a particular date is selected users can only navigate among appointments on that date, and cannot navigate to a different date unless they first exit to a different page. Additionally, most current calendar applications convey appointment details with scattered bullets of text, which can be difficult to interpret, particularly when the user does not have time to stop and read. An implementation of the present disclosure relates to a calendar that allows users to easily navigate between both dates and appointments, and conveys the details of the appointment in an easily interpretable manner.

Figure 8:
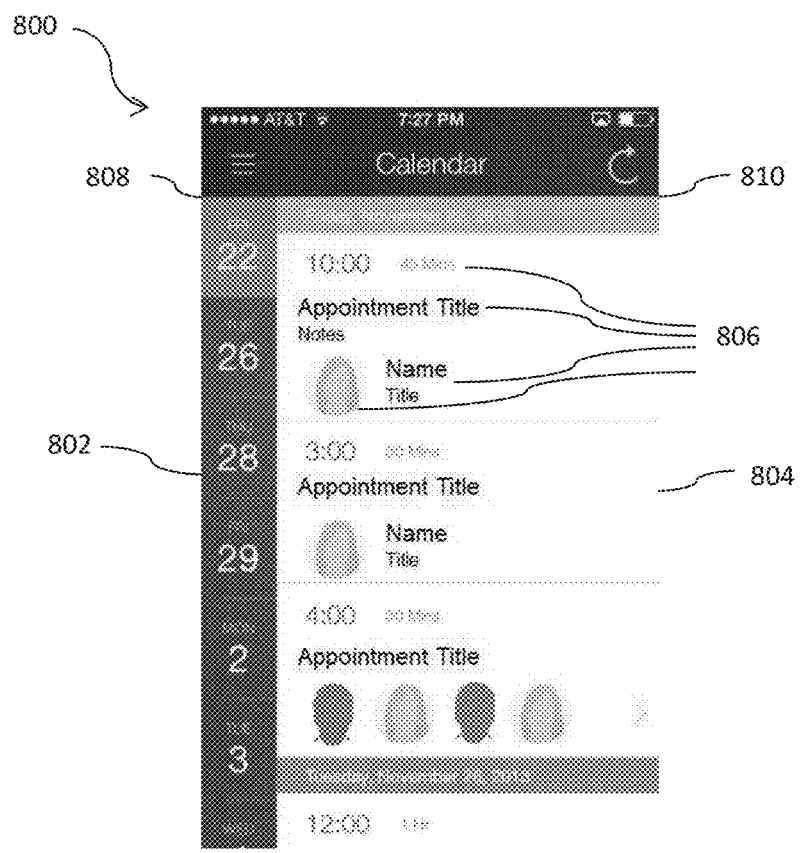
FIG. 8 illustrates an example graphical user interface for a calendar as presented on a display of a client device according to an implementation of this disclosure.

FIG. 8 shows an example calendar 800 of the present disclosure which can comprise a GUI provided on a client device, for example, through execution of an application located on the client device or one or more servers accessible from the client device. The calendar 800 can include an interactive date list 802 adjacent to an interactive appointment list 804. The interactive date list 802 lists a plurality of day dates (e.g. in increasing order). Generally speaking a day date is a graphical representation that conveys the day and/or date to the user. In some instances, the day date only displays the day of the week (e.g. Monday, Tuesday, etc.) and/or the day of the month (e.g. 1, 2, etc.). In other instances, it can also display the month and/or the year. The date list 802 itself can generally list any day dates the user wants displayed, for example, every day of the calendar year, certain days of every week (e.g. every Tuesday and Friday), or only dates on for which the user has an appointment entered in the calendar 800. In general a user may interact with the date list 802 by navigating among day dates, for example, by scrolling the date list or selecting a day date. Scrolling of the date list can occur in any direction along the 2D plane defining the surface of a client device, for example, vertically or horizontally. Examples of selecting a day date can include touching the graphical representation of the day date, using an input device, or identifying the day date by voice into a VUI.

The appointment list 804 lists a plurality of appointments. Appointments on different days may, in some cases, be separated by a graphical representation of the date, which may display the day of the week, month, day of the month, and/or year. Appointments on the same day can generally be separated in any manner that allows the user to distinguish between appointments, for example, with a line. Within each date the appointments can generally be ordered in any manner the user desires, for example by time of day or importance. Each appointment in the appointment list 804 displays pertinent information 806 about the appointment. Non-limiting examples of such pertinent information 806 can include the appointment's title, time, length, attendees, and specific notes about the meeting. In some implementations, the attendees can be displayed with a graphical representation such as, for example, a digital picture of the attendee or a logo of the company the attendee is associated with. The graphical representation can be taken from an image associated with the individual on the client device's contacts list, or in some cases from an external location such as a social media profile. The information 806 may also include each attendee's name and/or title. In general a user can interact with the appointment list 804 by navigating among appointments, for example, by scrolling the appointment list or selecting an appointment. Scrolling of the appointment list can occur in any direction along the 2D plane defining the surface of a client device, for example, vertically or horizontally. Examples of selecting an appointment can include touching the graphical representation of the appointment, using an input device, or identifying the appointment by voice into a VUI.

In some implementations, whenever a user is not interacting with the calendar 800, a day date is located at a head 808 of the date list 802, and an appointment occurring on that day date is located at a head 810 of the appointment list 804. Generally speaking the head of the date list 808 and the head of the appointment list 810 are positions on the GUI. In some implementations, these positions abut the boundary of the visible portion of the GUI such that upon certain further user interaction with the GUI the day date located at the head of the date list 808 and the appointment located at the head of the appointment list 810 are the first day date and the first appointment to disappear from view. Such further user interaction may include, in some examples, scrolling the lists. Examples of the head of the date list 808 can include the topmost or leftmost position in the date list 802 that is visible in the GUI, and examples of the head of the appointment list 810 can include the topmost or leftmost position in the appointment list 804 that is visible in the GUI. To give one illustrative example, the head of the date list 808 and the head of the appointment list 810 may be located at the topmost positions in their respective lists that are visible in the GUI; upon scrolling the date list 802 upward, the day date located at the head of the date list 808 is the first day date to disappear from view, and upon scrolling the appointment list 804 upward, the appointment located at the head of the appointment list 810 is the first appointment to disappear from view.

Figure 9:
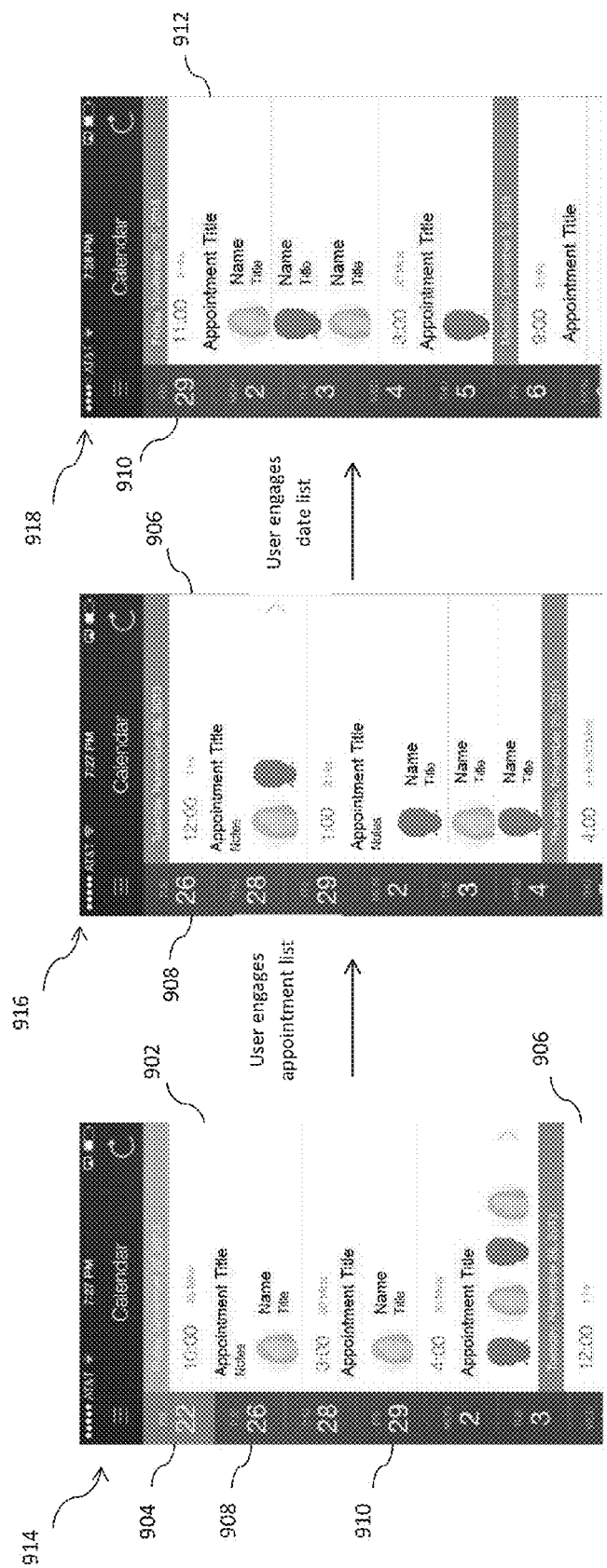
FIG. 9 is a flow chart showing example appearances of a graphical user interface as a calendar is operated according to an implementation of this disclosure.

FIG. 9 is a flow chart showing example appearances of the GUI as the calendar 800 is operated. FIG. 9 shows 3 views 914, 916, 918 of the GUI at various stages of user engagement of the calendar 800. View 914 shows an example GUI having a date list adjacent an appointment list, where the appointment list contains a first appointment 902 positioned at the head of the appointment list, and the date list contains a first day date 904 positioned at the head of the date list. In some implementations, a user may engage the appointment list such that a second appointment 906 replaces the first appointment 902 at the head of the appointment list, which in some cases can result in the first appointment 902 disappearing from view. Such engagement can involve, for example, the user scrolling the appointment list or selecting an appointment. In some implementations, following user selection of an appointment, the appointment list may automatically adjust itself to position the selected appointment at the head of the appointment list. Such automatic adjustment can include, for example, scrolling the appointment list or redisplaying the appointment list with the updated appointment positioning. After the second appointment 906 is positioned at the head of the appointment list, the date list can automatically be adjusted such that a second day date 908 on which the second appointment 906 occurs replaces the first day date 904 at the head of the date list. Such automatic adjustment can involve, for example, scrolling the date list or redisplaying the date list with the updated day date positioning. In some instances, such date list adjustment can result in the first day date 904 disappearing from view. During adjustment of the date list, the appointment list can, in some cases, remain stationary. View 916 shows an example GUI with the second appointment 906 positioned at the head of the appointment list and the second day date 908 positioned at the head of the date list.

In some implementations, a user may engage the date list such that a third day date 910 replaces the second day date 908 at the head of the date list, which in some cases can result in the second day date 908 disappearing from view. Such engagement can involve, for example, the user scrolling the date list or selecting a day date. In implementations where a user selects a day date, the day date list may automatically adjust itself to position the selected day date at the head of the date list. Such automatic adjustment can include, for example, scrolling the date list or redisplaying the date list with the updated day date positioning. After the third day date 910 is positioned at the head of the date list, the appointment list may automatically be adjusted such that a third appointment 912 which occurs on the third day date 910 replaces the second appointment 906 at the head of the appointment list. Such automatic adjustment can involve, for example, scrolling the appointment list or redisplaying the appointment list with the updated appointment positioning. In some instances, such appointment list adjustment can result in the second appointment 906 disappearing from view. During adjustment of the appointment list, the date list can, in some cases, remain stationary. View 918 shows an example GUI with the third appointment 912 positioned at the head of the appointment list and the third day date 910 positioned at the head of the date list.

The above description is meant to illustrate exemplary possible user interactions with the calendar 800. Performance of every step described is not required in order to practice implementations of the present disclosure. For example, in some implementations, a user may prefer to navigate the appointment list and allow the date list to automatically adjust. In such implementations, the user may only perform, for example, the steps discussed in conjunction with converting the GUI from its appearance in view 914 to its appearance in view 916. In other implementations, a user may prefer to navigate the date list and allow the appointment list to automatically adjust. In these implementations, the user may only perform, for example, the steps discussed in conjunction with converting the GUI from its appearance in view 916 to its appearance in view 918.

Figure 10:
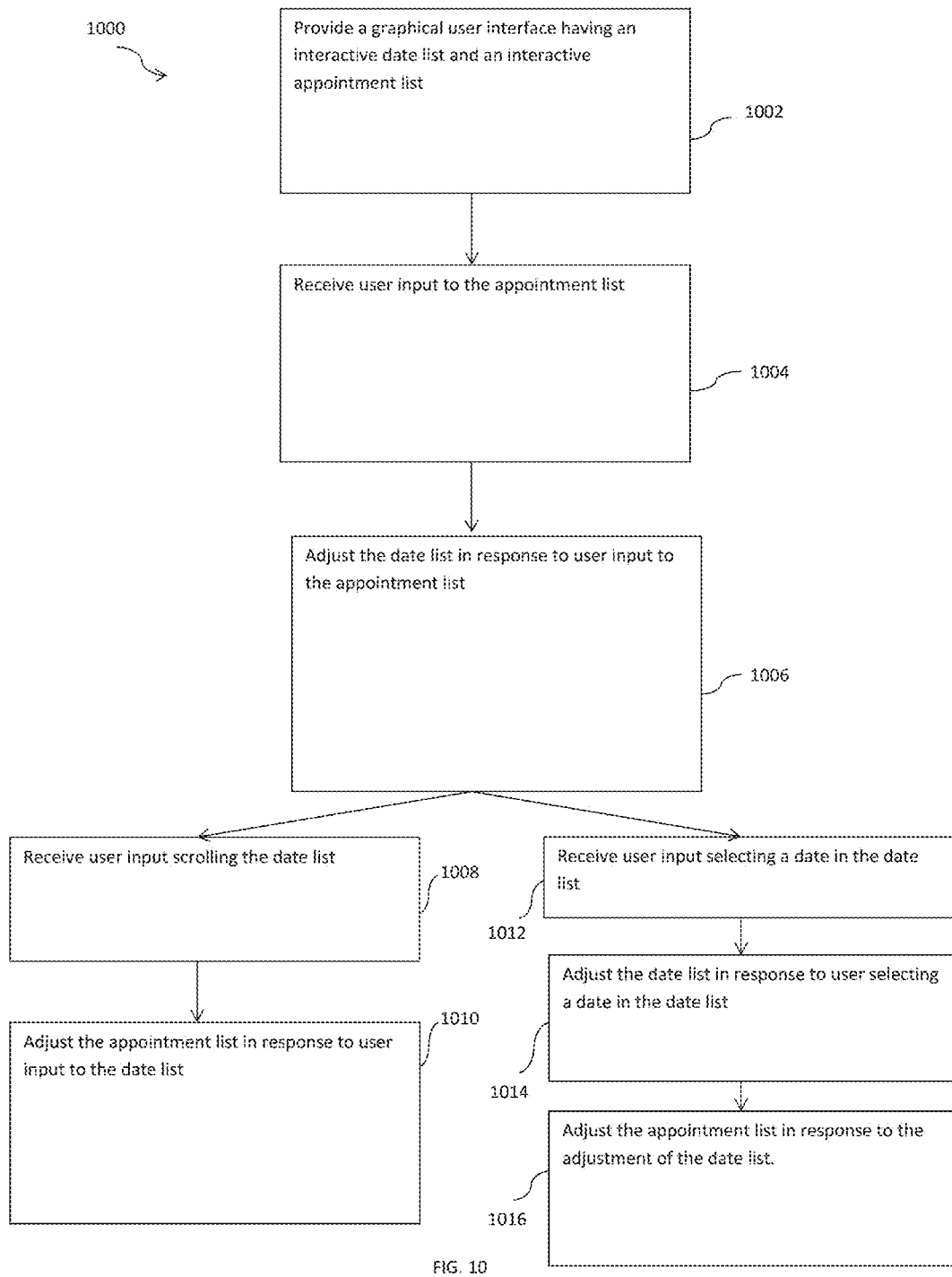
FIG. 10 is a flow chart showing an example method of operating a calendar according to implementations of this disclosure.

FIG. 10 is a flow chart showing an example method 1000 of operating the calendar 800. In various implementations, the method can be implemented by computer instructions executed by one or more data processing apparatus in one or more geographic locations. In some implementations, the software is implemented by the system described with reference to FIG. 12. In some implementations, the method includes providing 1002 a GUI having an interactive date list adjacent to an interactive appointment list, where the date list lists day dates in increasing order and the appointment list lists appointments ordered by date and time. The method can include receiving 1004 user input scrolling the appointment list such that a first appointment in the appointment list is replaced at a head of the appointment list by a second appointment in the appointment list such that the second appointment is visible in the GUI. After the second appointment is positioned at the head of the appointment list, the method can include adjusting (e.g. scrolling) 1006 the date list such that a first day date in the date list is replaced at a head of the date list by a second day date in the date list that is for the second appointment such that the second day date is visible in the GUI, where the appointment list remains stationary during scrolling of the date list. In some implementations, the method can include receiving 1008 user input scrolling the date list such that a third date in the date list is positioned at the head of the date list and is visible in the GUI. In such implementations, after the third date is positioned at the head of the date list, the method can include adjusting (e.g. scrolling) 1010 the appointment list such that a third appointment in the appointment list that is for the third date is positioned at the head of the appointment list; the date list remaining stationary during scrolling of the appointment list. In other implementations, the method can include receiving 1012 user input selecting a date in the date list which is visible in the GUI. In such implementations, the method can include adjusting (e.g. scrolling) 1014 the date list such that the selected date is positioned at the head of the date list; the appointment list remaining stationary during scrolling of the date list, and adjusting (e.g. scrolling) 1016 the appointment list such that an appointment for the selected date is positioned at the head of the appointment list; the date list remaining stationary during scrolling of the appointment list.

Figure 11:
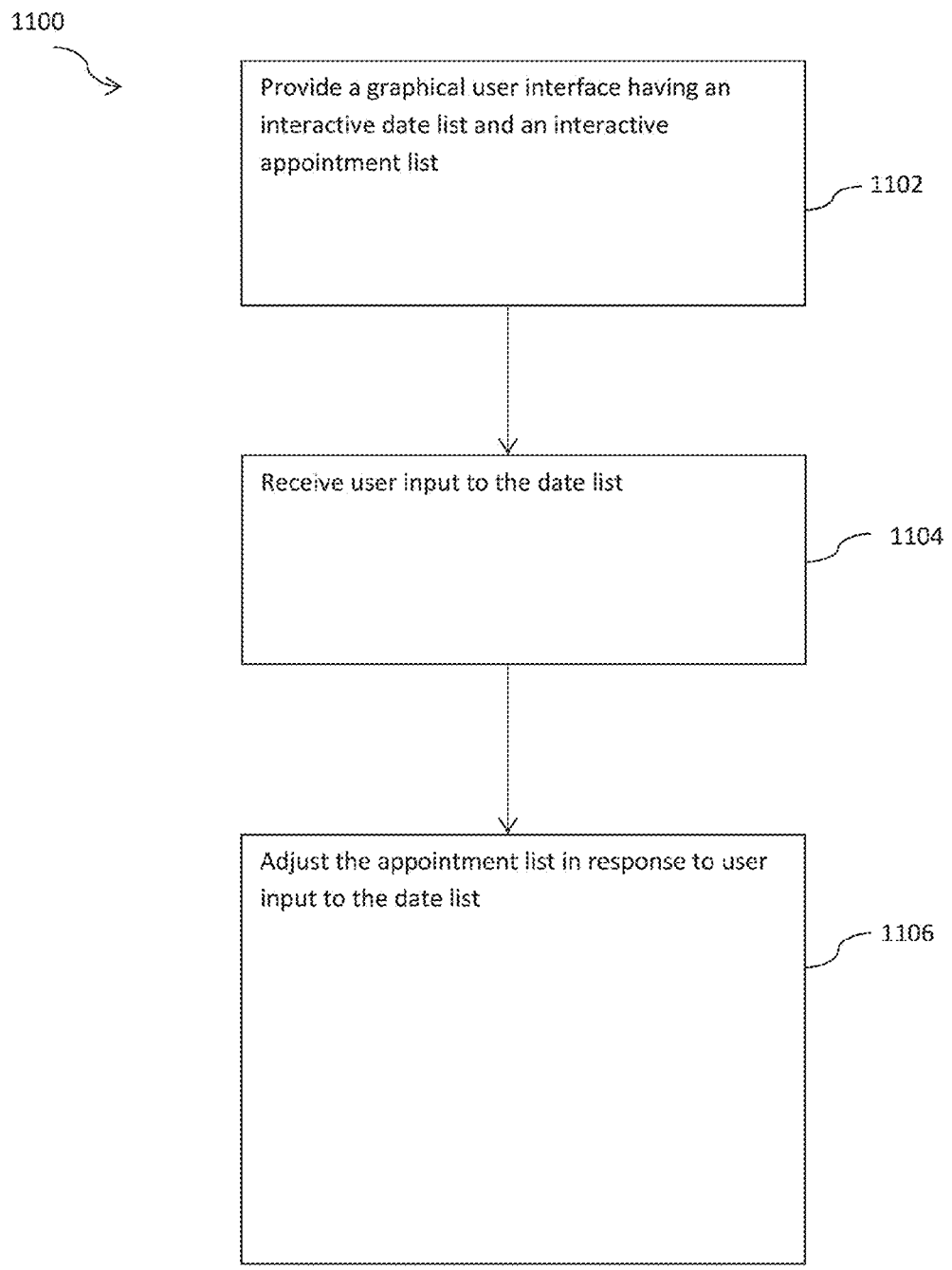
FIG. 11 is a flow chart showing another example method of operating a calendar according to an implementation of this disclosure.

FIG. 11 is a flow chart showing another example method 1100 of operating the calendar 800. In various implementations, the method can be implemented by computer instructions executed by one or more data processing apparatus in one or more geographic locations. In some implementations, the software is implemented by the system described with reference to FIG. 12. In example implementations, the method includes providing 1102 a GUI having an interactive date list adjacent to an interactive appointment list, where the date list lists day dates in increasing order and the appointment list lists appointments ordered by date and time. The method can include receiving 1104 user input to the date list resulting in a first day date in the date list being replaced at a head of the date list by a second day date in the date list such that the second day date is visible in the GUI. After the second day date is positioned at the head of the date list, the method can include adjusting (e.g. scrolling) 1106 the appointment list such that a first appointment in the appointment list is replaced at a head of the appointment list by a second appointment in the appointment list that occurs on the second day date such that the second appointment is visible in the GUI, wherein the date list remains stationary during the scrolling of the appointment list. In some instances, the step of receiving user input to the date list comprises a user scrolling the date list. In other instances, receiving user input to the date list comprises a user selecting a second day date in the date list. In cases where the user selects a second day date, the method can include scrolling the date list such that the second day date is positioned at the head of the date list, where the appointment list remains stationary during the scrolling of the date list.

Making Connections with Contacts Based on Proximity to a Location

It is sometimes desirable for an individual to connect with or reach out to a contact when both the individual and the contact will be in the same geographic proximity. Being in close proximity can, for example, allow for the benefits of an in-person interaction which is not always an option for contacts usually located great distances apart. Many individuals, however, have numerous contacts in a given geographic location. Thus, it can be even more desirable to identify which contact or contacts are most likely to accept a request for an in-person meeting. Implementations of the present disclosure relate to methods, systems, apparatus, and computer programs for identifying contacts located in proximity to a particular geographic location and selecting a contact or contacts based on a likelihood that they will accept a request for an in-person meeting.

Generating a Dossier for a Contact Encounter

As discussed already, before an individual encounters a contact, it can be beneficial to quickly absorb general information about the contact, for example, information about the contact's family, the contact's interests, and/or the contact's educational and professional background. In some instances, generation of a dossier about each contact prior to an encounter can be helpful. However, manual generation of a dossier can be labor intensive and time consuming. Further, it can be difficult to determine how much detail to include in the dossier. If too little detail is included, the individual may be unprepared for the encounter with the contact. But if too much detail is included, the individual may not be able to absorb the information before the encounter. Thus, it can be desirable for an individual to have a dossier generated about a contact prior to a future encounter, where the dossier contains an appropriate amount of detail. Implementations of the present disclosure relate to methods, systems, apparatus, and computer programs for automatically generating a dossier for the contact(s) that an individual will encounter. Some implementations can includes determining an appropriate amount of detail to include about a particular contact based on, for example, prior interactions with the contact.

Systems

Figure 12:
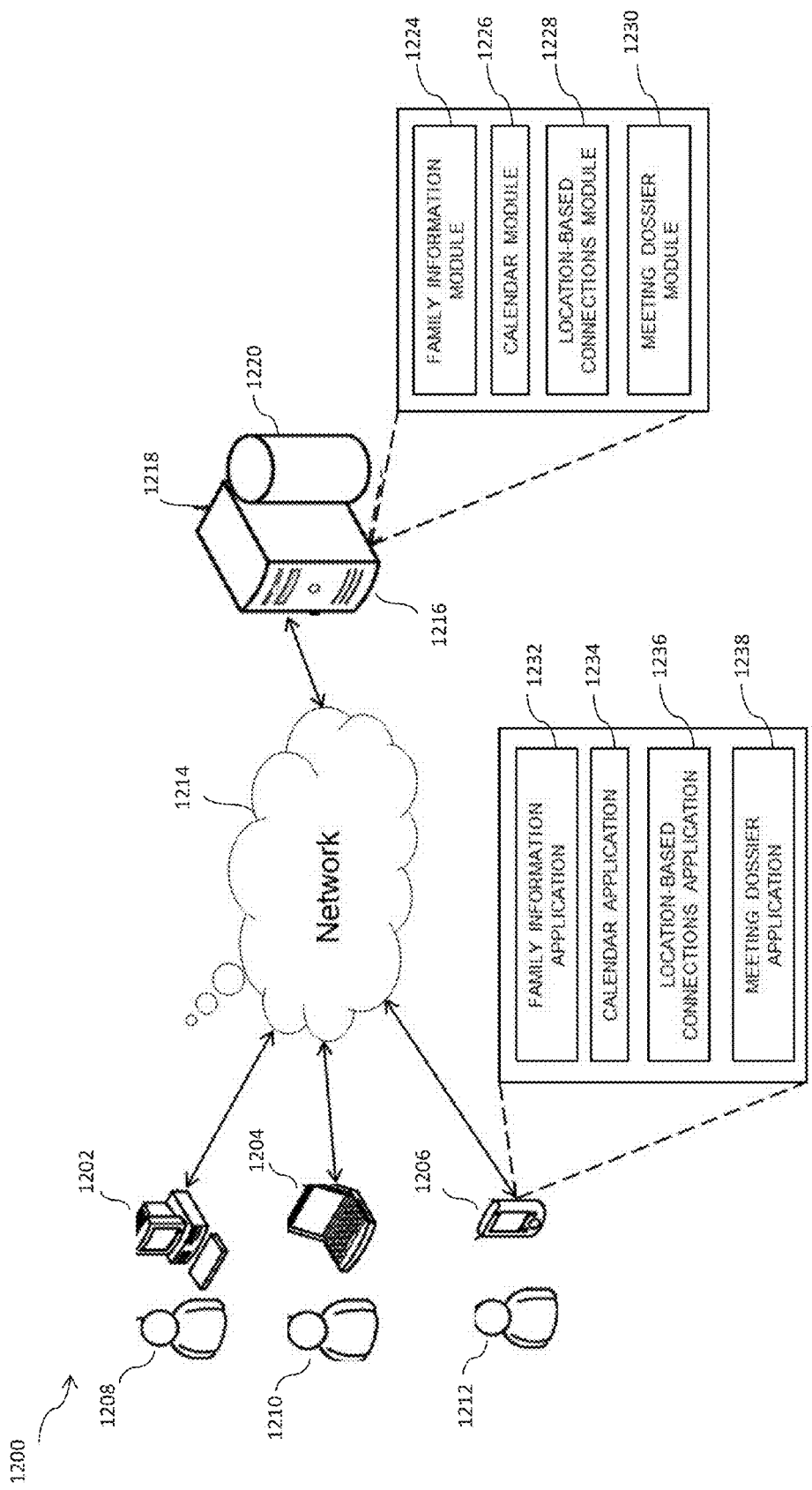
FIG. 12 illustrates an example system for performing implementations of this disclosure.

Implementations of the subject matter described herein can, in some instances, be embodied in a system. FIG. 12 is a block diagram showing an example system 1200 on which the subject matter can be implemented. System 1200 includes client devices 1202, 1204, 1206 that are configured to communicate with a server system 1216 over a network 1214. Client devices 1202, 1204, 1206 have respective users 1208, 1210, 1212 associated therewith. The server system 1216 includes at least one computing device 1218 and memory 1220. Example system 1200 can include additional client devices and servers which are not shown.

Network 1214 can include a large computer network, examples of which include a local area network (LAN), wide area network (WAN), the Internet, a cellular network, or a combination thereof connecting a number of mobile client devices, fixed client devices, and server systems. The network(s) included in network 1214 can provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Ethernet, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication can occur through a radio-frequency transceiver. In addition, short-range communication can occur, e.g., using a BLUETOOTH, WiFi, or other such transceiver system.

Client devices 1202, 1204, 1206 enable respective users 1208, 1210, 1212 to engage a GUI provided by, for example, an application. The application can be stored on and executed by the client device 1202, 1204, 1206 or the server system 1216.

In example system 1200, client device 1202 is illustrated as desktop-type computing device, client device 1204 is illustrated as a laptop-type computing device, and client device 1206 is illustrated as a mobile computing device. It is noted, however, that client devices 1202, 1204, 1206 can include, e.g., a desktop computer, a laptop computer, a handheld computer, a television with one or more processors embedded therein and/or coupled thereto, a tablet computing device, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a client device can be included as part of a motor vehicle (e.g., an automobile).

Users interacting with client devices 1202, 1204, 1206 can interact with an application for managing a contact's family information 1232, a calendar application 1234, an application for connecting with contacts based on proximity to a location 1236, and a meeting dossier application 1238, as described in this disclosure. The applications 1232, 1234, 1236, 1238 allow for execution of the methods described in this specification, and can be implemented as software, hardware or a combination of software and hardware that is executed on a processing apparatus, such as one or more computing devices. In various implementations, client devices 1202, 1204, 1206 can be enabled such that the user can interact with one, all, or any combination of two or more of these applications.

The applications 1232, 1234, 1236, 1238 can be hosted by a corresponding family information module 1224, calendar module 1226, location-based connections module 1228, and meeting dossier module 1230 on the server system 1216. The modules 1224, 1226, 1228, 1230 can be implemented as software, hardware or a combination of software and hardware that is executed on a processing apparatus, such as one or more computing devices.

Operating Environment

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
providing an image in a graphical user interface wherein the image comprises an arrangement of one or more family member depictions, each family member depiction being (i) at least one of a cartoon image and a stick figure and (ii) based on respective attributes of a corresponding family member;
providing an interactive first control wherein the first control (i) has a respective graphical representation in the graphical user interface and (ii) is at least one of a slider control, a wheel control, and a roller control;
obtaining input based on user interaction with the graphical representation of the first control, the input indicating a count, the count being a number of additional family member depictions to be added to the image, wherein the count is based on an extent of the interaction, such that as the extent of the interaction increases, the count of additional family members varies, wherein the graphical representation of the first control indicates the count by displaying the number of additional family member depictions to be added to the image;
modifying the image in the graphical user interface to add a respective depiction of each of the additional family members to the arrangement; and
modifying the graphical user interface to include a graphical representation of a respective information input region for each of the additional family members wherein the input region allows for user input of one or more respective attributes for the family member.

2. The method of claim 1 wherein the family member depictions include a depiction of a child and a depiction of a parent, and wherein the child depiction is smaller than the parent depiction.

3. The method of claim 1 wherein the family member depictions include one or more parent depictions and one or more child depictions, and wherein the parent depictions are in the center of the arrangement.

4. The method of claim 1 wherein only a portion of the graphical user interface is visible.

5. The method of claim 1 wherein a particular attribute is one of: gender, spousal relationship, age, and species.

6. The method of claim 5 wherein a size of a particular family member depiction is based on an age of the corresponding family member.

7. The method of claim 1 further comprising:
receiving user input to a particular input region, the user input comprising a first attribute of the additional family member; and
modifying the depiction of the additional family member in the image to reflect the first attribute.

8. The method of claim 7 wherein modifying the depiction of the additional family member in the image comprises one or more of: changing a size of the depiction, changing a shape of the depiction, annotating the depiction with a name of the family member, and annotating the depiction with an age of the family member.

9. A system comprising:
one or more data processing apparatus programmed to perform operations comprising:
providing an image in a graphical user interface wherein the image comprises an arrangement of one or more family member depictions, each family member depiction being (i) at least one of a cartoon image and a stick figure and (ii) based on respective attributes of a corresponding family member;
providing an interactive first control wherein the first control (i) has a respective graphical representation in the graphical user interface and (ii) is at least one of a slider control, a wheel control, and a roller control;
obtaining input based on user interaction with the graphical representation of the first control, the input indicating a count, the count being a number of additional family member depictions to be added to the image, wherein the count is based on an extent of the interaction, such that as the extent of the interaction increases, the count of additional family members varies, wherein the graphical representation of the first control indicates the count by displaying the number of additional family member depictions to be added to the image;
modifying the image in the graphical user interface to add a respective depiction of each of the additional family members to the arrangement; and
modifying the graphical user interface to include a graphical representation of a respective information input region for each of the additional family members wherein the input region allows for user input of one or more respective attributes for the family member.

10. The system of claim 9 wherein the family member depictions include a depiction of a child and a depiction of a parent, and wherein the child depiction is smaller than the parent depiction.

11. The system of claim 9 wherein the family member depictions include one or more parent depictions and one or more child depictions, and wherein the parent depictions are in the center of the arrangement.

12. The system of claim 9 wherein only a portion of the graphical user interface is visible.

13. The system of claim 9 wherein a particular attribute is one of: gender, spousal relationship, age, and species.

14. The system of claim 13 wherein a size of a particular family member depiction is based on an age of the corresponding family member.

15. The system of claim 9 wherein the operations further comprise:
   receiving user input to a particular input region, the user input comprising a first attribute of the additional family member; and
   modifying the depiction of the additional family member in the image to reflect the first attribute.

16. The system of claim 15 wherein modifying the depiction of the additional family member in the image comprises one or more of: changing a size of the depiction, changing a shape of the depiction, annotating the depiction with a name of the family member, and annotating the depiction with an age of the family member.

17. A non-transitory computer-readable storage medium having instructions stored thereon that when executed by data processing apparatus cause the data processing apparatus to perform operations comprising:
   providing an image in a graphical user interface wherein the image comprises an arrangement of one or more family member depictions, each family member depiction being (i) at least one of a cartoon image and a stick figure and (ii) based on respective attributes of a corresponding family member;
   providing an interactive first control wherein the first control (i) has a respective graphical representation in the graphical user interface and (ii) is at least one of a slider control, a wheel control, and a roller control;
   obtaining input based on user interaction with the graphical representation of the first control, the input indicating a count, the count being a number of additional family member depictions to be added to the image, wherein the count is based on an extent of the interaction, such that as the extent of the interaction increases, the count of additional family members varies, wherein the graphical representation of the first control indicates the count by displaying the number of additional family member depictions to be added to the image;
   modifying the image in the graphical user interface to add a respective depiction of each of the additional family members to the arrangement; and
   modifying the graphical user interface to include a graphical representation of a respective information input region for each of the additional family members wherein the input region allows for user input of one or more respective attributes for the family member.

18. The non-transitory computer-readable storage medium of claim 17 wherein the family member depictions include a depiction of a child and a depiction of a parent, and wherein the child depiction is smaller than the parent depiction.

19. The non-transitory computer-readable storage medium of claim 17 wherein the family member depictions include one or more parent depictions and one or more child depictions, and wherein the parent depictions are in the center of the arrangement.

20. The non-transitory computer-readable storage medium of claim 17 wherein a particular attribute is one of: gender, spousal relationship, age, and species.

21. The non-transitory computer-readable storage medium of claim 20 wherein a size of a particular family member depiction is based on an age of the corresponding family member.

22. The non-transitory computer-readable storage medium of claim 17 wherein the operations further comprise:
   receiving user input to a particular input region, the user input comprising a first attribute of the additional family member; and
   modifying the depiction of the additional family member in the image to reflect the first attribute.

23. The non-transitory computer-readable storage medium of claim 22 wherein modifying the depiction of the additional family member in the image comprises one or more of: changing a size of the depiction, changing a shape of the depiction, annotating the depiction with a name of the family member, and annotating the depiction with an age of the family member.

* * * * *